C. J. W. ROBERTSON.
SELF OPENING AND CLOSING GATE FOR MOTOR VEHICLES.
APPLICATION FILED JUNE 14, 1920.
1,389,271.
Patented Aug. 30, 1921.
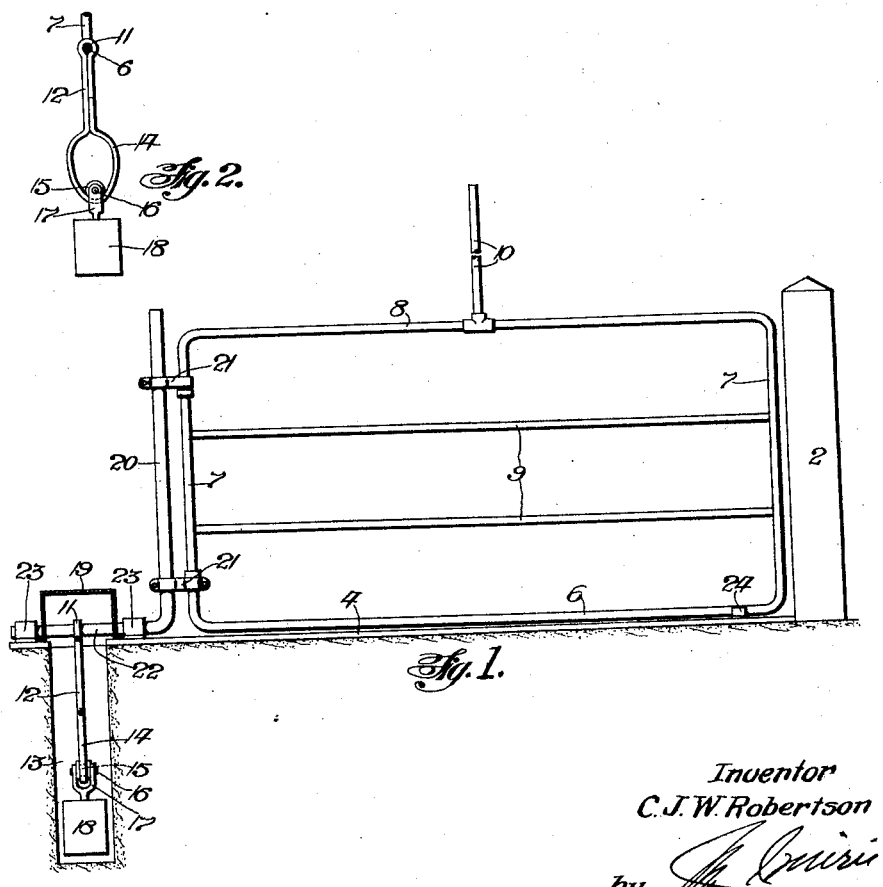
Inventor
C. J. W. Robertson
by
Att'y

UNITED STATES PATENT OFFICE.

CHARLES J. W. ROBERTSON, OF YARRAM, OF VICTORIA, AUSTRALIA.

SELF OPENING AND CLOSING GATE FOR MOTOR-VEHICLES.

1,389,271.

Specification of Letters Patent.   Patented Aug. 30, 1921.

Application filed June 14, 1920. Serial No. 388,960.

*To all whom it may concern:*

Be it known that I, CHARLES JAMES WILKIE ROBERTSON, farmer, a subject of the King of Great Britain and Ireland, residing near the post town of Yarram, in the district of Gippsland, State of Victoria, Commonwealth of Australia, (whose post-office address is "Hawthorn Bank," near the said post town of Yarram, in the district of Gippsland,) have invented certain new and useful Improvements in Self Opening and Closing Gates for Motor-Vehicles, of which the following is a specification.

The object of this invention is to provide a gate by the use of which it will not be necessary for the driver of a motor vehicle to stop in order to operate gate catches or the like, as the gate upon the application of pressure by the vehicle wheels will descend into a horizontal position approximately level with the ground, thereby permitting the vehicle to pass over it. The gate automatically resumes its normal vertical position, when the vehicle has passed. The invention also aims at providing a gate of the above character which may be used as an ordinary gate when desired. The features of novelty, however, will be more particularly pointed out in the appended claims.

Referring to the drawings which form part of this specification:—

Figure 1 is a view in elevation of the gate in accordance with the improved construction.

Fig. 2 is a side elevation of the swinging arm and weight.

In the preferred embodiment of my invention as shown in Fig. 1, the gate is not only capable of being swung in a vertical plane by the pressure of a passing motor vehicle but is also capable of swinging in a horizontal plane in the usual manner to permit of the passage of animal drawn vehicles, pedestrians, live stock, and the like. The gate is arranged adjacent the gate post 2 and embodies a ground sill 4 adjacent which the lower member 6 of the gate is normally arranged. The side members 7 of the gate are connected by a top member 8 and intermediate brace members 9. An extension 10 projects upwardly from the member 8 which may be used for a hand operation of the gate or may serve as a projection to be engaged by a portion of the vehicle passing over the gate, so that the gate will not rise until the vehicle is free of the projection. In this case the gate is hinged to a vertical hinging post 20 so that it may swing in a horizontal plane about the axis of the ordinary hinges 21. The lower end of the post 20 carries a horizontal oscillating arm 22 mounted in horizontally disposed bearings 23 so that the gate and vertical hinging post may swing bodily through a vertical arc about the axis of said arm and transversely to the length of the gate. The gate and hinging post may in this embodiment also be returned to and maintained in normal vertical position by means of the weight 18 hung from the arm 12 which is secured at its upper end to the oscillating arm 22 of the hinging post. Under normal conditions the bottom member 6 of the gate rests in a semicircular bed piece or open topped bearing 24 mounted on the ground sill 4 near the end of the gate remote from the post 20. This bed provides a support for the outer end of the gate which turns within it when the gate is swung through the vertical plane. When the gate is swung horizontally in the ordinary manner it is lifted out of this bed piece, the construction of the hinges 21 permitting of the necessary slight upward movement of the outer end of the gate. It will also be seen that the bed piece acts as a catch or retainer to hold the gate in closed position.

By driving a motor vehicle against the gate just described the gate and hinging post will fall into a horizontal position permitting the vehicle to pass over the gate the arm 22 turning in the bearings 23 and the bottom member 6 of the gate in the bed piece 24. Immediately the weight of the vehicle has passed off the gate the weight 18 rolling in the loop 14 turns the arm 22 in the reverse direction swinging the hinging post and the gate back into their normal vertical position in which they are retained by the hanging weight 18. Should it be desired to open the gate to a horse drawn vehicle, live stock or the like it is merely lifted out of the bed piece 24 and swung horizontally about the hinges 21 in the usual manner. If desired a spring or self releasing catch such as 3 may be employed to hold the gate stationarily in its normal position and prevent it swinging idly in a strong wind.

It will be seen that the upward extension 10 takes the form of a single upstanding bar secured to the top of the gate. Should the front wheels of a motor vehicle pass off the gate before the rear wheels run on to it this upstanding bar will engage the bottom of the vehicle which will glide over the bar without the latter catching in or fouling any of the lower parts of the vehicle. The gate is thereby held down until the rear wheels of the car have passed over it.

Having now described my invention what I claim as new and desire to secure by Letters Patent is: —

1. A gate hinged to swing in a horizontal plane in combination with means whereby the gate may be swung in a vertical plane from an upright to a horizontal position under the influence of pressure exerted by a vehicle passing over the gate and means to automatically return the gate from the horizontal to the upright position on removal of said pressure.

2. In a gate, a vertical hinging post, a gate hinged to said post to swing in a horizontal plane, in combination with means for mounting said hinging post whereby the latter and the gate may be swung bodily in a vertical plane from an upright to a horizontal position under the influence of pressure exerted by a vehicle passing over the gate and means to automatically return the hinging post and gate from the horizontal to the upright position on removal of said pressure.

3. In a gate, a vertical hinging post, a gate hinged to said post to swing in a horizontal plane, in combination with a horizontally disposed oscillating arm attached to the lower end of said post and bearings accommodating said arm whereby the hinging post and gate may be swung bodily in a vertical plane from an upright to a horizontal position under the influence of pressure exerted by a vehicle passing over the gate and means to automatically return the hinging post and gate from the horizontal to the upright position on removal of said pressure.

4. In a gate, a vertical hinging post, a gate hinged to said post to swing in a horizontal plane, in combination with means whereby the hinging post and gate may be swung bodily in a vertical plane from an upright to a horizontal position under the influence of pressure exerted by a vehicle passing over the gate and a weight acting upon said hinging post to automatically return the gate to normal upright position upon removal of said pressure.

5. In a gate, a vertical hinging post, a gate hinged to said post to swing in a horizontal plane, bearings mounted near the ground, a horizontally disposed oscillating arm attached to the hinging post and mounted in said bearings whereby the hinging post and gate may be swung bodily in a vertical plane from an upright to a horizontal position under the influence of pressure exerted by a vehicle passing over the gate, and a swinging weight acting upon the oscillating arm to automatically return the gate from the horizontal to the upright position upon removal of said pressure.

6. In a gate, a vertical hinging post, a gate hinged to said post to swing in a horizontal plane, a horizontal oscillating arm supporting the lower end of said post whereby the gate may be swung in a vertical plane from an upright to a horizontal position under the influence of pressure exerted by a vehicle passing over the gate, a swinging arm depending from said oscillating arm and a weight suspended from the lower end of said swinging arm to automatically return the hinging post and gate from the horizontal to the upright position upon the removal of said pressure.

7. In a gate, a vertical hinging post, a gate hinged to said post to swing in a horizontal plane, a horizontal oscillating arm supporting the lower end of said post whereby the gate may be swung in a vertical plane from an upright to a horizontal position under the influence of pressure exerted by a vehicle passing over the gate, a swinging arm depending from the oscillating arm, a loop pending from said swinging arm, a roller accarried by said loop and a weight accommodated by said roller to automatically return the gate from the horizontal to the upright position upon removal of said pressure.

8. A gate hinged to swing in a horizontal plane in combination with means whereby the gate may be swung in a vertical plane from an upright to a horizontal positon under the influence of pressure exerted by a vehicle passing over the gate, means to automatically return the gate from the horizontal to the upright position upon removal of said pressure and a bed piece adapted to accommodate the bottom of the gate when the latter is in its normal position or is being swung in a vertical plane, the gate being removed from said bed piece when it is to be swung in a horizontal plane about its hinges.

9. A gate mounted for opening movement in either of two distinct planes, comprising a supporting post having a lateral base portion supported to permit the post to move in a vertical plane, a weight, connections between the weight and lateral base portion of the post, whereby the weight may act to normally hold the post upright, and a gate hingedly mounted on the post for swinging in a horizontal plane with relation to said post.

In testimony whereof I affix my signature.

C. J. W. ROBERTSON.

Witness:
  Cecil M. Plestrier.